April 5, 1966     D. R. BENNION     3,245,056
MAGNETIC-CORE SEQUENCE DETECTORS
Filed Feb. 14, 1961                            2 Sheets-Sheet 1
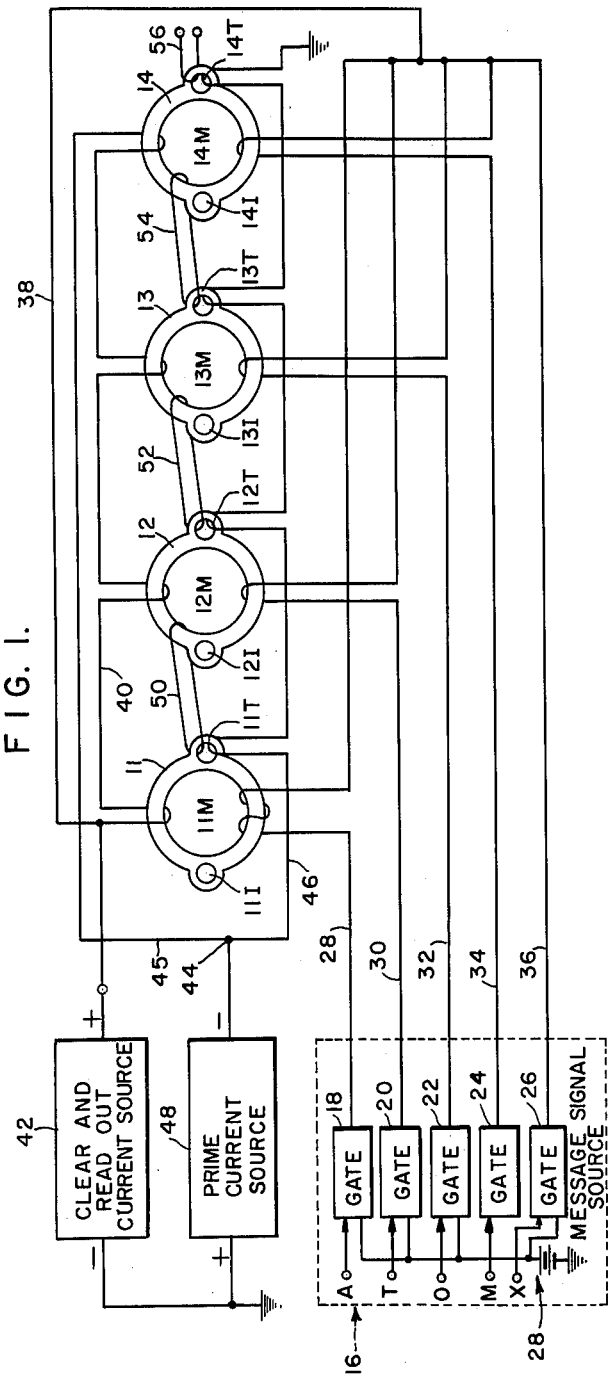
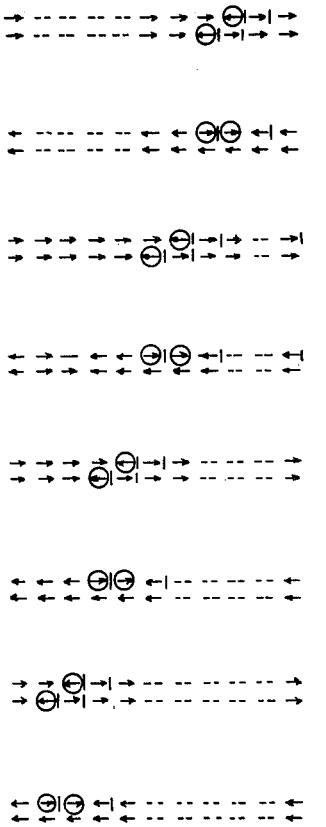
*INVENTOR.*
DAVID R. BENNION
BY
*Lyon & Lyon*
ATTORNEYS.

April 5, 1966 D. R. BENNION 3,245,056
MAGNETIC-CORE SEQUENCE DETECTORS
Filed Feb. 14, 1961 2 Sheets-Sheet 2

INVENTOR.
DAVID R. BENNION
BY Lyon & Lyon
ATTORNEYS.

United States Patent Office 3,245,056
Patented Apr. 5, 1966

3,245,056
MAGNETIC-CORE SEQUENCE DETECTORS
David R. Bennion, Menlo Park, Calif., assignor to AMP Incorporated, Harrisburg, Pa., a corporation of New Jersey
Filed Feb. 14, 1961, Ser. No. 89,172
10 Claims. (Cl. 340—174)

This invention relates to systems of logic using magnetic-core circuits and, more particularly, to improvements therein.

In an application for a logical sequence detection system, by Hewitt D. Crane, Serial No. 755,742, filed August 18, 1958, now abandoned, which is assigned to a common assignee, there is described a sequence detector which employs magnetic cores, for example, for detecting the currents of a proper sequence of signals. A sequence detector is analogous to a combination lock which will open only if the proper sequence of numbers has been followed.

An object of the present invention is the provision of a sequence detector employing magnetic cores wherein the wiring required is simplified.

Another object of the present invention is the provision of a novel sequence detector.

Yet another object of this invention is the provision of an improved sequence detector of the general type indicated which is more inexpensive to make than those heretofore described.

These and other objects of the invention are achieved in an arrangement wherein toroidal magnetic cores are employed of the multiaperture type having at least one additional small aperture in the ring of the toroid. A separate drive winding is provided for each signal in a predetermined sequence to be detected. An exciting current is applied to each drive winding upon the occurence of a signal with which it is associated. These drive windings are coupled to the magnetic cores in a manner so that upon the occurrence of the desired signals, with consequent excitation of the windings, the magnetic cores are driven to transfer flux from one to the other in sequence with an output being derivable from the last core in the sequence only if the desired signal sequence has occurred.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a circuit diagram of an embodiment of the invention; and

Figure 2:
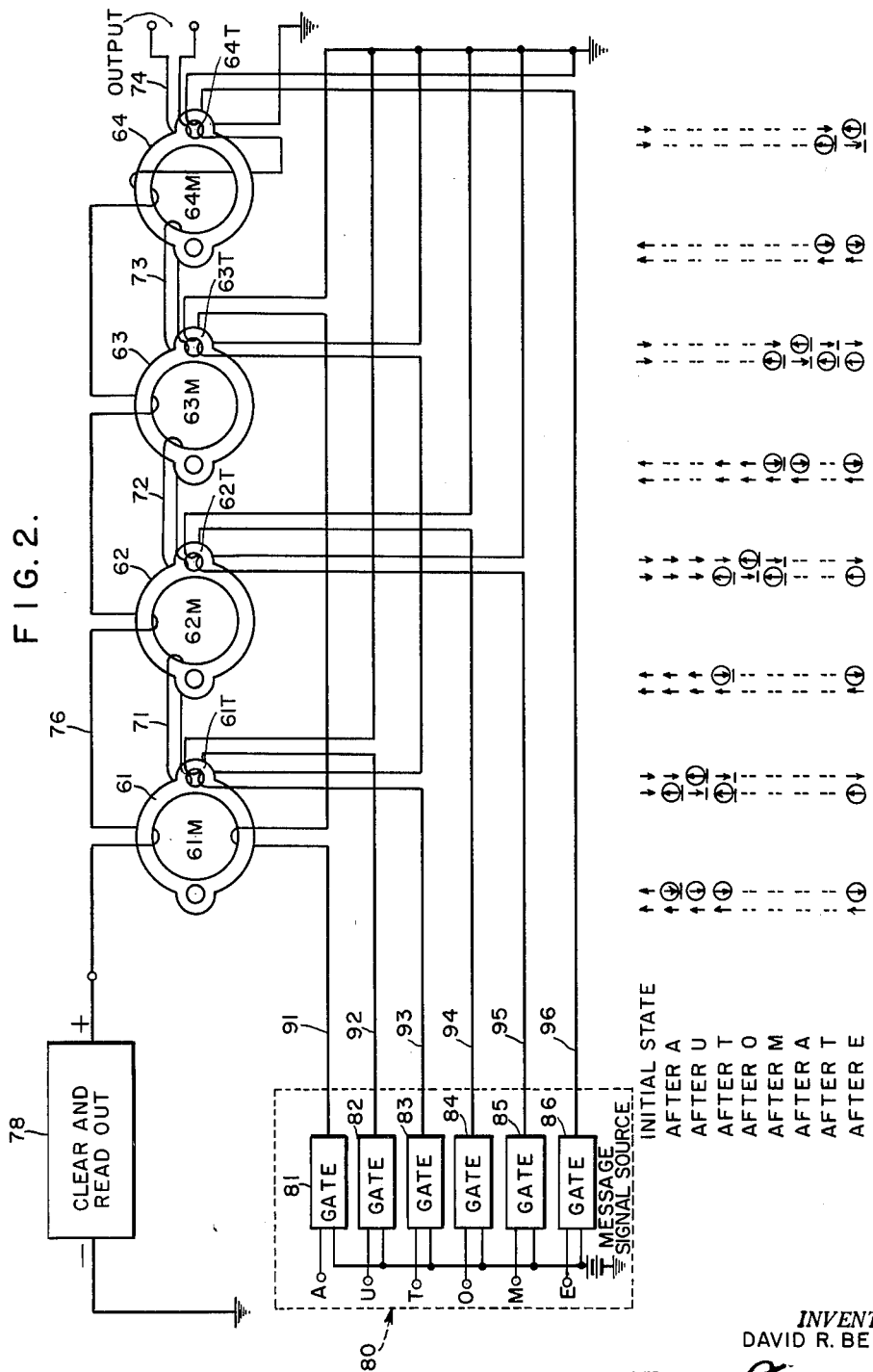
FIGURE 2 is a circuit diagram of another embodiment of the invention.

FIGURE 1 shows a circuit diagram of an embodiment of the invention of a type wherein information which has already been entered into the magnetic-core sequence detector is cleared as a signal in the desired sequence occurs and only one core in the sequence is maintained in its set state. There is shown an arrangement for detecting the signals of a sequence representing the letters ATOM. This, of course, is to be considered only exemplary of the utility of the invention, and is not to be construed as a limitation thereon. Those skilled in the art will readily appreciate how to extend the teachings of this invention to detect other signal sequences of different lengths without departing from the spirit and scope of this invention. For detecting the word ATOM, the sequence detector includes four magnetic cores 11, 12, 13, and 14, each being of the type known as a multiaperture core and including at least two apertures. One of these is called the main aperture, respectively 11M, 12M, 13M, and 14M, and the other aperture is called the output aperture, respectively 11T, 12T, 13T, and 14T. Another small aperture, usually called the input aperture, respectively 11I, 12I, 13I, 14I, is shown, but is not used in this embodiment of the invention.

A source of signals, which may provide the signals desired in a predetermined sequence, is designated as a message signal source 16. Gates, respectively 18, 20, 22, and 24, are provided for each one of the signals desired to be detected, as well as gate 26 for all other signals which occur. These gates are connected to a source of potential 28 so that when any of the signals are received a gate closes and current is applied to a succeeding drive winding or drive line. These gates are exemplary of apparatus, such as keys on a typewriter, signal-detecting circuits which are enabled upon the occurrence of required inputs, etc., any of which are well-known expedients for enabling a pulse of current to pass upon the occurrence of a required input. A winding or line 28, 30, 32, 34, and 36 is associated with and provided for each of the gates 18 through 26, which in turn are associated with each one of the signals derived from the message signal source.

Since the signal representing "A" is the first in the desired sequence to be detected, the winding 28 is coupled to the first core 11 in the core sequence by passing through the main aperture 11M. The winding 30, which is associated with the second signal to be detected, is coupled to the second core 12 in the core sequence passing through the main aperture 12M. The third signal "O" in the sequence has its associated winding 32 inductively coupled to the third core 13 in the magnetic-core sequence by passing through the main aperture 13M thereof. The fourth signal in the sequence to be detected—namely, "M"— has its associated winding 34 inductively coupled to the fourth, or last, core in the magnetic-core sequence by passing through the main aperture 14M of the core 14. Other signals which occur, which are not in the sequence desired to be detected, are here represented by the letter "X." The line 36 is energized by the gate 26 being operated upon the occurrence of these other signals.

A common bus 38 is connected to the far ends of the lines 28, 30, 32, 34, and 36. The purpose of the common bus 38 is to apply current to a clear winding 40, which is inductively coupled to all the cores in core sequence by passing through their main apertures. The clear winding is also excited by current provided by a clear and readout current source 42. The end of the clear winding, not connected to the clear and readout current source, is connected to a terminal 44. A winding, designated as a priming winding 46, is inductively coupled to all the cores in the core sequence by passing through each one of the apertures 11T, 12T, 13T, and 14T. This winding is excited by current provided by a prime current source 48.

The magnetic cores 11, 12, 13, and 14 are of the type which have substantially two states of magnetic remanence. One of these may be designated as the clear state and the other as the set state. The apparatus shown in FIGURE 1 commences operation with all the cores initially set in the clear state. This is achieved by exciting the clear winding 40 with a current pulse from the clear and readout source 42. When a magnetic core is in its clear state, the magnetic flux therein may be represented as circulating in a clockwise direction. The flux states which exist in each one of the cores 11 through 14 will be represented by the direction of arrows which are positioned immediately below the two small terminal apertures in each one of the cores. Two arrows are provided for each terminal aperture to illustrate the direction of the flux which is passing through the material of the core adjacent the terminal aperture. The material of a core between a terminal and major aperture has been called the "inner" or "inside leg," and the material of a core adjacent a terminal aperture and the outer periphery of the core has been referred to as the "outer leg." Thus, one of the two arrows adjacent the terminal aperture represents the direction of flux circulation through the inner leg, and the arrow below the outer leg of the core represents the flux circulation therethrough.

To the left of the table of arrows there is succinctly stated the operation which provides, as a result, the flux state represented by the arrows which are in the same row as the operation designation. The location of a change in flux state as a result of an operation is underlined, and the direction of an arrow which is different from the cleared state is circled.

At the outset of an operation, all cores are in their cleared or initial state. Thus, the arrows underneath each one of the cores represent a flux circulation in a clockwise direction. It will be noted that upon the occurrence of any one of the undesired signals as represented by X, gate 26 is opened, a current pulse is applied to the line 36 and to the common bus 38, which, in turn, excites the clear winding 40 and also the priming winding 46. The priming winding, when excited through the clear winding, assists the clear winding by cancelling the effects of any spurious drives which are induced in the transfer windings as a result of the clear drive. Thus, regardless of the number of desired signals in the sequence which have been detected, upon the occurrence of an undesired signal, the cores in the sequence detector are returned to their clear states.

Assume, now, that signals representing the letter "A" are detected, whereupon the gate 18 is unblocked. Current flows through the winding 28 and drives the core 11 to its set state. As shown by the arrows on the line designated "After receipt of A," the flux around the main aperture has reversed its direction, which would, of course, include the flux passing through the inner legs of the core 11. Excitation of the winding 28 also results in excitation of the clear winding 40, through the bus 38, which connects winding 28 to winding 40. However, the number of turns of the winding 28 on the core 11 are sufficient to not only inhibit or counteract the effect of the excitation of the clear winding, but also to drive the core 11 to its set state.

The next operation, which incidentally follows each signal detection, is an operation designated as priming. This is effectuated by exciting the winding 46 with a current from the prime current source 48. This current causes a magnetomotive force to be applied to the apertures 11T, 12T, 13T, and 14T. The magnetomotive force provided by the prime current tends to drive the flux in the inner and outer legs of material adjacent these terminal apertures in a counterclockwise direction. This flux direction is the reverse of that achieved by the set drive. The direction of the arrows underneath the terminal aperture 11T on the line designated as "After prime" indicate the reversal of the flux around the terminal aperture 11T.

Should an "X" signal occur, core 11 will be returned to its clear state. However, should the signal following the "A" signal be a "T" signal, then the gate 20 is closed sufficiently to enable a current pulse to be applied to the drive winding 30 and also to the clear winding 40. The magnetomotive force provided by the winding 30, which tends to drive the core 12 to its set state, is cancelled by the magnetomotive force applied by the clear winding 40. However, the clear winding 40, in driving the primed core 11 to its clear state, causes a reversal of flux to occur about the aperture 11T, whereby a voltage is induced in a transfer winding 50, which is inductively coupled to the core 11 through its output aperture 11T and to the core 12 through its main aperture 12M. The voltage induced in the transfer winding 50 results in core 12 being driven to its set state. The state of flux in the core is indicated by the direction of the arrows on the line "After receipt of T" and underneath the core 12. A prime current pulse is next supplied from the prime current source 48 to the line 46 again. This will result in the flux in the core 12 assuming the direction designated by the direction of the arrows thereunder which are on the line "After prime," underneath the line representing the receipt of the "T" signal.

Upon receipt of an "O" signal following the "T" signal, the switch 22 is closed to permit a pulse current to be applied to the line 32. The magnetomotive forces applied to the core 13 by currents flowing through line 32 and line 40 effectively cancel one another. However, core 12 in being cleared induces a voltage in a transfer winding 52 which is inductively coupled to the core 12 through its aperture 12T and to core 13 through its main aperture 13M. As a result, the core 13 is driven to its set state. This is shown by the direction of the arrows underneath core 13 on the line designated "After receipt of O." In this state, as indicated by the direction of arrows, the flux in the portion of the ferrite material of the core 13 around the main aperture 13M, which includes the inner legs of the material adjacent the terminal apertures, is circulating in a counterclockwise direction, while the remainder of the ferrite material, which includes the material in the outer legs adjacent the terminal apertures, circulates in a clockwise direction. The operation of the prime current source 48, which follows the receipt of the "O" signal, primes the material of the core which is adjacent the terminal aperture 13T.

Should an "X" signal be received at this time, then, as previously indicated, all the cores of the sequence detector would be driven to the clear states, and the sequence would have to be detected from the beginning again. However, should an "M" signal be detected at this time, then the gate 24 is closed to enable a counter pulse to be applied to the drive winding 34. The drive winding 34 cancels the effect of the energization of the clear winding 40. However, core 13, in being driven to its clear state by the clear winding 40, induces a voltage in the transfer winding 54. Transfer winding 54 is coupled to the core 13 through its terminal aperture 13T and to the core 14 through its main aperture 14M. As a result, the core 14 is driven to its set state.

The priming winding 46 is then energized, resulting in the toroid material adjacent the terminal aperture 14T being primed. An excitation of the clear winding 40 from the clear and readout current source 42, or in response to any other signal occurring at the message signal source (except the "M" signal), results in the core 14 being driven to its clear state, whereby an output winding 56 has a voltage induced therein. Excitation of the output winding 56 indicates that a successful detection of the desired sequence of signals has been made.

In FIGURE 1, an "N" element detector is shown, which is wired to detect an N-digit sequence for the case $N=4$. It should be noted, however, that the readout operation can be separated from the clear operation and that the final digit in the sequence can be used for reading out. Hence, it is possible to detect an $N+1$ digit sequence with an N-element detector. A complete sequence detection must occur in order for a success signal to be obtained; otherwise, the core sequence detector is cleared and a detection operation must be commenced anew.

Reference is now made to FIGURE 2 of the drawings, which shows another embodiment of the invention. In this embodiment of the invention, there is no clearing out of the information previously entered into the sequence detector, either as it advances or in the event of signals other than the sequence occurring between the occurrence of signals in the sequence. The states of the magnetic flux in the magnetic cores 61, 62, 63, 64, which are employed to detect a sequence of signals representing, for example, AUTOMATE, is represented by arrows having the same significance as was given to them in connection with the explanation of FIGURE 1. The arrows identifying the flux state in the respective courses are positioned beneath these cores, as before.

The cores 61 through 64 may be of the same type as cores 11 through 14 in FIGURE 1. Each one of the cores is coupled to a succeeding core by a transfer winding, respectively 71, 72, 73, which are coupled therebetween by passing through the terminal apertures, respectively 61T, 62T, 63T, and thereafter through the main apertures of the succeeding cores, respectively 62M, 63M, 64M. An output winding 74 is coupled to the terminal aperture 64T of the core 64. A clear winding 76 is inductively coupled to all the cores through their main apertures, respectively 61M, 62M, 63M, 64M. The clear winding is also inductively coupled to the terminal aperture 64T of the last core in the sequence detector for the purpose of assisting in the readout from that core. The clear winding is driven by a source of clear and readout current pulses 78.

A message signal source 80, which is of the same type as was described in connection with FIGURE 1, is enabled to energize one of the gates, respectively 81, 82, 83, 84, 85, 86, whenever a signal representative of the signals in the desired sequence occurs. Operation of one of the switches 81 through 86 enables a current pulse to be applied to one of the drive windings, respectively 91, 92, 93, 94, 95, and 96, which are associated with the switches 81 through 86, as well as with the signals representing the letters AUTOME, which are used in the word AUTOMATE. Signals representing the letters "A" and "T" are used twice in the word AUTOMATE, which is being sensed. The drive windings 91 and 93 are used twice in operating the magnetic or sequence detectors 61 through 74. Thus, drive winding 91 is inductively coupled to the core 61 by being wound thereon through its main aperture 61M, and it is also inductively coupled to the core 63 by being wound thereon through its terminal aperture 63T. The signals representing the letter "U" are employed once in the signal sequence, and thus the drive winding 92 associated therewith is inductively coupled to core 61 passing through the terminal aperture 61T of core 61. The letter "T" is used twice in the predetermined signal sequence, and the drive winding 93, associated therewith, is inductively coupled to core 61 by passing through the terminal aperture 61T, and also to core 63 by passing through the terminal aperture 63T. The signals representing the letter "O" are used only once, and the drive winding 94 associated therewith is coupled to core 62 by threading through the terminal aperture 62T. The signals representing the letter "M" are employed only once in the sequence being detected, and the drive winding 95, associated therewith, is coupled to core 62 passing through the terminal aperture 62T of the core. The signals representing the letter E are employed only once in the sequence being detected, and the drive winding 96, associated therewith, threads through the terminal aperture 64T of the last core in the magnetic-core sequence. The drive windings 91 through 96 are all connected at their far ends to a common terminal and to ground.

From the above description, it should be noted that the first drive winding associated with the first of the signals in the sequence being detected is coupled to the main aperture of the first core in the sequence. All other drive windings are coupled to the terminal apertures of the cores in the sequence. The number of times these are coupled to the respective terminal apertures of the cores in the sequence is determined by the number of times the same signals are employed in the sequence source to be detected.

The pattern of drive-winding coupling to the cores is determined by the order of the signal with which a drive winding is associated in the sequence. The drive winding associated with the first signal in the sequence is coupled to the first core for the purpose of driving it to its set state. Thereafter, the drive windings may be thought of as being in pairs. A first of a pair is associated with an earlier signal in the sequence and is used for priming a core. The following winding of a pair is associated with the following signal and is used for resetting the core. This will become more clear with the following description of the operation of the sequence detector.

Assume, now, that the signals representing the letter "A" are detected at the message source, and gate 81 is closed to enable a current pulse to be sent down the drive winding 91. Magnetic core 61 is driven from its clear to its set state by the portion of the drive winding 91 which is wound through the main aperture of core 61. However, the portion of the drive winding 91 which is wound on core 63 through the aperture 63T has no effect on the ferrite material surrounding that aperture, since core 63 is in its clear state and the drive applied tends to drive core 63 further into its clear state. The flux in core 61 assumes the orientation represented by the direction of the arrows on the line designated as "After A." The flux around the main aperture and including the inner legs of core material circulates in a counterclockwise direction while the flux in the core material in the outer portion of core 61, which includes the outer legs of material, circulates in a clockwise direction.

Assume, now, that the signal representing the letter "U" is detected and therefore gate 82 is actuated to enable a current pulse to be transmitted down the drive line 92. As a result, a priming drive is applied to the ferrite material surrounding the terminal aperture 61T. The amplitude of this drive is such as to affect the core material only about the terminal aperture 61T. As shown by the arrows on the line identified as "After U," the orientation of the flux in the inner and outer legs is in reverse to the orientation which exists when core 61 is driven to its set state.

The detection of the T-representative signal enables switch 83 to be momentarily closed, whereby a pulse of current is applied to the drive line 93. This applies a magnetomotive force to the core material surrounding the terminal aperture 61T, sufficient to drive it back to the state from which it was driven by the priming drive. As a result, a voltage is induced in the transfer winding 71 which causes a current to flow in a direction to drive magnetic core 62 to its set state. The flux state in cores 61 and 62, which results in response to the "After T" drive, is represented by the direction of the arrows on the "After T" line.

A detection of an "O" signal results in the operation of gate 84 to momentarily energize drive line 94. This primes the material about aperture 62T. Upon detection of the "M" signal, gate 85 is energized to apply a momentary pulse of current to drive line 95, whereby the ferrite material of core 62 is driven back to the flux state, identical to the set state. This induces a voltage in the transfer winding 72, in response to which current flows in a direction to drive core 63 to its set condition. The next detection of an "A" signal energizes gate 81, whereby a pulse of current is applied to the drive winding 91. This applies a drive to core 61 in a direction to drive it to its set state, in which state it already exists. A drive is also applied to the ferrite material surrounding terminal aperture 83T, whereby the material surrounding that aperture is driven to its prime state.

A detection of a "T" signal energizes gate 83, whereby drive winding 93 receives a current pulse. This applies a drive to the ferrite material surrounding terminal aperture 61T in a direction to re-establish the flux in the inner and outer legs about that aperture in a set state. A drive is also applied to the ferrite material about terminal aperture 63T, to drive that material toward its set state of flux. Since core 61 is already in its set state, the drive of the portion of the winding 93 to the material of core 61 has no effect. However, the ferrite material about terminal aperture 63T is driven back to its set state of flux, whereby a voltage is induced in the transfer winding 73. The resulting current flow applies a magnetomotive force to drive magnetic core 64 to its set state. The state of magnetic flux of the core is designated by the direction of the arrows on the second "After T" line.

Upon detection of an "E" signal, the gate 86 is energized to apply a current pulse to drive winding 96. This results in a priming drive being applied to the ferrite material surrounding the aperture 64T. The clear and readout current source 78 is next energized and applies a current to the clear winding 76. As a result, all the cores 61 through 64 are driven to their clear states. Also, the clear winding is coupled to the terminal aperture 64T, to insure that, in being driven to its clear state, a voltage is induced as a result in the output winding 74, indicative of the fact that a successful detection of the desired sequence has been made.

The clear and readout current source 78 may be operated after an interval sufficient to afford a successful, sequence detection, whereby, if this does not occur, the cores of the sequence detector are cleared and a fresh sequence must be detected. The wiring pattern of the drive windings is determined by the position of the signal in the sequence, with which signal these drive windings are associated. Thus, the signal "U" precedes the signal "T," and therefore drive winding 92 associated with "U" performs the priming operation on core 61, and drive winding 93, associated with "T," performs the advance operation. Drive winding 94, associated with "O," provides the prime operation on core 63, and drive winding 95, associated with "M," provides the advance operation on core 62. Drive winding 91, associated with "A," provides the prime operation on core 63, and drive winding 93, associated with "T," provides the advance operation on core 63. The first core in the sequence is employed to detect three signals in the sequence; the remaining cores in the sequence detect the arrival of two signals. The last core in the sequence is shown as detecting the arrival of the last signal in the sequence. Another signal may be employed to be detected by the last core for the purpose of readout, instead of using the clear and readout of winding 78.

There has accordingly been shown and described herein a novel, useful, and improved sequence detector which employs magnetic cores as active elements therefor. The winding required for constructing the embodiment of the invention is considerably simplified over systems previously described.

I claim:

1. A system for detecting the occurrence of signals in a predetermined signal sequence at a signal source comprising a plurality of magnetic cores made of a material having two states of magnetic remanence, each of said cores being substantially toroidal and having a main aperture and a terminal aperture, said cores being arranged in sequence, a plurality of transfer windings each of which couples a different two of said plurality of cores in said sequence for driving a succeeding one of said two cores to one of said two states of magnetic remanence in response to a current flow induced in said transfer winding where the preceding one of said two cores is driven, and means for successively driving the material around the minor aperture of each successive core in sequence from one to the other state of magnetic remanence for inducing current in successive transfer windings for successively driving said core sequence responsive to said signals in said predetermined sequence, said means for successively driving including a plurality of drive windings arranged in a sequence corresponding to said predetermined signal sequence, each successive drive winding being coupled to only a single one of said cores through one of its apertures, means upon the occurrence of one of said signals for exciting the drive winding corresponding in its sequence to the position of said one of said signals in its sequence, and means for driving the last core of said sequence to derive an output therefrom upon the successful detection of said predetermined signal sequence.

2. A system as recited in claim 1 wherein said means for successively driving includes a priming winding inductively coupled to all said cores by their minor apertures, each said drive winding is coupled to a core through its major aperture and a clear winding coupled to every core by its major aperture.

3. A system as recited in claim 1 wherein a first of said drive windings is coupled to a first of said sequence of cores through its major aperture, each succeeding two drive windings in said sequence are successively coupled to the minor apertures of the successive cores in said sequence, the coupling of each two drive windings to a minor aperture being with a relatively opposite sense.

4. A system for detecting the occurrence of signals in a predetermined signal sequence at a signal source comprising a plurality of magnetic cores made of a material having two states of magnetic remanence, each of said cores being substantially toroidal and having a main aperture and a terminal aperture, said cores being arranged in sequence, a core in the same relative position in its sequence as a signal in said predetermined sequence being associated with that signal, a plurality of transfer windings, a different one of said transfer windings coupling a different one of said cores through its terminal aperture to a succeeding one of said cores through its main aperture, first winding means for driving the first core of said sequence to one of said two states of magnetic remanence responsive to the occurrence of a first of said predetermined signals, a plurality of second winding means a different one of which is inductively coupled through one of the core apertures to a different one of said cores other than said first core for driving the core material around said aperture from one to the other state of magnetic remanence when energized whereby a voltage is induced in the transfer winding on said core and a succeeding core to which said transfer winding is coupled is driven to its one state of magnetic remanence in response thereto, means for applying a current pulse upon the occurrence of a signal in said predetermined signal sequence to the one of said second winding means coupled to a core associated with said signal, and means for applying a magnetomotive drive to the last of the cores in the sequence to determine whether a predetermined signal sequence has occurred.

5. A system for detecting the occurrence of signals in a predetermined signal sequence at a signal source comprising a plurality of magnetic cores made of a material having two states of magnetic remanence, each of said cores being substantially toroidal and having a main and a terminal aperture, said cores being arranged in sequence, a core in the same relative position in its sequence as a signal in said predetermined sequence being associated with that signal, a plurality of transfer windings, a different one of said transfer windings coupling a different one of said cores through its terminal apertures to a succeeding one of said cores through its main aperture, clear winding means for applying a clear drive from one to the other state of magnetic remanence to all of said magnetic cores upon the occurrence of a signal in said signal source, first drive winding means for driving the first core in said sequence to its one state of magnetic remanence upon the occurrence of the signal in said sequence with which said first core is associated despite said clear drive, a second winding means for each core other than the first to apply a drive to nullify the clear drive to a core associated with a signal in said sequence upon the occurrence of said signal, prime winding means for applying a drive after each signal on said source to the core material surrounding the terminal aperture of every core for reversing the state of remanence of said core material of a core which has been driven to said one state of magnetic remanence.

6. A system as recited in claim 5 wherein said clear winding means comprises a winding inductively coupled to every core through its main aperture, said first winding means comprises a winding inductively coupled to said first core through its main aperture, each said second winding means comprises a winding inductively coupled to each of said cores through its main aperture, and said priming winding includes a winding inductively coupled to every core through its terminal aperture.

7. A system for detecting the occurrence of signals in a predetermined signal sequence at a signal source comprising a plurality of magnetic cores made of a material having two states of magnetic remanence, each of said cores being substantially toroidal and having a main and a terminal aperture, said cores being arranged in sequence, a core in the same relative position in its sequence as a signal in said predetermined sequence being associated with that signal, a plurality of transfer windings, a different one of said transfer windings coupling a different one of said cores through its terminal apertures to a succeeding one of said cores through its main aperture, a clear winding coupled to all said cores for driving them when excited from one to the other state of magnetic remanence, a prime winding coupled to all said cores through their terminal apertures for reversing when excited the state of remanence of the core material around a terminal aperture of a core which is in its one state of magnetic remanence, a plurality of drive windings each of which is coupled to a different one of said magnetic cores for counteracting when excited the effect on a core of an excited clear winding, the one of said plurality of drive windings which is coupled to the first core of said core sequence having a sufficient number of turns to drive when excited said first core to said one state of remanence, means for applying excitation to said clear winding and to the one of said plurality of drive windings upon the occurrence of one of the signals in said predetermined signal sequence which is coupled to a core associated with said signal, means for applying excitation to said prime winding and to said clear winding in a direction to drive said cores to said one state of remanence after the occurrence of each signal at said signal source, and means for applying excitation to said clear winding for deriving an output from the last core in said sequence if a successful detection of said predetermined signal sequence has occurred.

8. A system as recited in claim 7 wherein said means for applying excitation to said clear winding and to one of said plurality of drive windings includes a connection between one end of all said plurality of drive windings and one end of said clear winding, and said means for applying excitation to said prime winding and said clear winding in a direction to drive said cores to said one state of remanence includes a connection between one end of said prime winding and the other end of said clear winding.

9. A system for detecting the occurrence of signals in a predetermined signal sequence at a signal source comprising a plurality of magnetic cores made of a material having two states of magnetic remanence, each of said cores being substantially toroidal and having a main and a terminal aperture, said cores being arranged in sequence, a plurality of transfer windings, a different one of said transfer windings coupling a different one of said cores through its terminal apertures to a succeeding one of said cores through its main aperture, first drive winding means for driving a first of said sequence of cores to one of said states of magnetic remanence responsive to the occurrence of the first signal in said predetermined sequence, a separate prime drive winding means coupled to each core for reversing when excited the state of remanence of the core material around the terminal aperture of a core which is in said one state of magnetic remanence, a separate reset drive winding means coupled to each core for reversing when excited the state of remanence of the core material around a terminal aperture which has been driven by one of said prime drive winding means to induce a voltage in the transfer winding coupled to the core affected by said reset drive winding means to drive the succeeding core to which said transfer winding is coupled to its said one state of magnetic remanence, means to excite in sequence each successive prime drive winding means upon the successive occurrence of alternate signals in said predetermined sequence commencing with the second of said signals, means to excite in sequence each successive reset drive winding means upon the successive occurrence of remaining signals in said predetermined sequence commencing with the third of said signals, means for driving the last core of said core sequence to derive an output therefrom after a successful signal sequence detection has occurred.

10. The system as recited in claim 9 wherein each said prime drive winding means comprises a winding inductively coupled to a core through its terminal aperture, each said reset drive winding means comprises a winding inductively coupled to a core through its terminal aperture, and said first drive winding means comprises a winding inductively coupled to said first core through its main aperture.

References Cited by the Examiner
UNITED STATES PATENTS

| | | | |
|---|---|---|---|
| 2,963,687 | 12/1960 | Briggs | 340—174 |
| 2,968,795 | 1/1961 | Briggs | 340—174 |
| 3,045,215 | 7/1962 | Gianola | 340—174 |

IRVING S. SRAGOW, *Primary Examiner.*

BERNARD KONICK, *Examiner.*